United States Patent
Bravo

(10) Patent No.: US 6,217,083 B1
(45) Date of Patent: Apr. 17, 2001

(54) SWIVEL FITTING

(76) Inventor: Sergio M. Bravo, 2872 Tigertail Dr., Los Alamitos, CA (US) 90720

( * ) Notice: Subject to any disclaimer, the term of this patent is extended or adjusted under 35 U.S.C. 154(b) by 0 days.

(21) Appl. No.: 09/277,681

(22) Filed: Mar. 26, 1999

Related U.S. Application Data

(63) Continuation of application No. 09/236,501, filed on Jan. 25, 1999.

(51) Int. Cl.$^7$ .................................................... F16L 27/08
(52) U.S. Cl. ............................................. 285/276; 285/279
(58) Field of Search ................................. 285/272, 276, 285/279, 39, 2

(56) References Cited

U.S. PATENT DOCUMENTS

| | | |
|---|---|---|
| 456,756 | 7/1891 | Bastian . |
| 1,366,634 | 1/1921 | Clark . |
| 2,396,123 | 3/1946 | Phillips ............................... 285/97.3 |
| 2,458,714 * | 1/1949 | Mahoney .............................. 285/276 |
| 2,518,443 * | 8/1950 | Bagnard ............................... 285/276 |
| 2,587,170 | 2/1952 | Klingler et al. ....................... 285/97.6 |
| 2,723,136 | 11/1955 | Deubler ................................ 285/97.3 |
| 2,745,682 * | 5/1956 | Chevallier ............................ 285/276 |
| 3,148,922 * | 9/1964 | Roessler .............................. 285/276 |
| 3,186,737 * | 6/1965 | Brundage ............................. 285/276 |
| 3,484,853 | 12/1969 | Nishi .................................... 285/93 |
| 3,900,221 * | 8/1975 | Fouts .................................... 285/276 |
| 4,120,520 * | 10/1978 | Ahlstone ............................. 285/305 |
| 4,260,183 | 4/1981 | Krupp ................................. 285/134 |
| 4,749,192 * | 6/1988 | Howeth ............................... 285/276 |
| 5,433,247 * | 7/1995 | Guertin .................................. 285/2 |
| 5,607,189 | 3/1997 | Howeth ................................. 285/39 |
| 5,664,951 | 9/1997 | Clary et al. ........................... 439/92 |

* cited by examiner

*Primary Examiner*—Dave W. Arola
(74) *Attorney, Agent, or Firm*—Christie, Parker & Hale, LLP

(57) ABSTRACT

A swivel fitting is provided for use on a riser line associated with the underground storage tank of gasoline service stations. The swivel fitting includes an adapter sleeve that attaches to the riser line and a swivel sleeve with a quick release fitting for use in removably attaching a product transfer hose as is typically used to transfer product to the underground storage tank from a tanker truck. The adapter and swivel sleeves are rotatably coupled by a plurality of ball bearings to permit smooth rotation of the quick release fitting with respect to the riser line.

4 Claims, 2 Drawing Sheets

SWIVEL FITTING

This application is a continuation of Ser. No. 09/236,501 filed Jan. 25 1999.

FIELD OF THE INVENTION

This invention is directed to improvements in known swivel fittings for use with riser lines used for transferring petroleum products to underground product storage tanks of the type found at gasoline service stations. The fitting permits a fuel hose to be removably attached to the riser line while permitting rotation of the hose during the transfer of product.

BACKGROUND OF THE INVENTION

Gasoline service stations typically include a number of underground storage tanks for storing fuel products. A conduit known as a riser line generally extends from the top of each tank to a manhole at the driveway surface of the service station. A drop tube may be concentrically disposed within the riser line, flush with the riser line at the surface but extending beyond the riser line and into the underground storage tank. By removing the manhole cover and a cap from the top of the riser, a hose can be connected to the riser line to fill the product tank with petroleum products delivered by tanker trucks. The hose is generally connected to the riser line using a connector known as a top seal delivery nozzle. Such nozzles allow the hose to be quickly connected and disconnected from the riser line at a fill adapter located on the top of the riser line to simplify product transfer. These fill adapters are typically threaded to the riser line which is in turn threaded into a collar on the top of its respective product tank. When the underground storage tank is not being filled, a removable cap is used to seal the fill adapter both to prevent contaminants from entering the product tank and to prevent hydrocarbon vapors from escaping from the tank.

One problem with the use of conventional top seal delivery nozzles is that while no twisting is required to fasten the nozzle to the fill adapter, during the transfer of product, especially at the end of the product transfer when the hose is lifted and drained of any remaining product, some twisting of the nozzle occurs. Such twisting of the hose can cause twisting of the fill adapter, loosening it from the riser line. To prevent such loosening of the fill adapter from the riser line, fill adapters are often equipped with set screws which lock them to the riser line. While such a practice prevents the fill adapter from loosening from the riser, it can cause twisting of the entire riser. This can sometimes cause the riser to loosen from the tank collar. The loosening of any of the fittings or connectors on the riser line is to be avoided as it can lead to product or vapor leakage, or product contamination.

At least one known swivel fitting has been developed for fill adapters to permit rotation of the nozzle with respect to the riser line without causing any loosening of either the connection between the fill adapter and riser line, or the riser line and underground storage tank. One such fitting is sold by OPW Fueling Components of Cincinnati, Ohio, and is illustrated in U.S. Pat. No. 5,664,951.

The '951 patent discloses a two-piece swivel adapter which uses a flexible, electrically conductive rod to rotatably couple the two pieces of the adapter. However, the rotation achieved by this swivel adapter can be rough. Thus there exists a need for an improved swivel fitting which provides smooth and even rotation.

SUMMARY OF THE INVENTION

An improved swivel fitting is disclosed which permits a typical top seal delivery nozzle to freely and smoothly rotate with respect to the riser line associated with an underground product storage tank. This simplifies the transfer of product from the tanker truck to the product tank by permitting some twisting of the transfer hose. Such twisting is permitted without causing any loosening of the fittings associated with the riser line as can be experienced when rigid connections are used.

A rotatable swivel fitting is provided in combination with an inlet conduit for an underground liquid storage tank. The rotatable swivel fitting is connected on one end to the inlet conduit for the tank. The opposite end of the swivel fitting is connected to a supply hose for supplying liquid to the underground storage tank. The fitting includes an adapter sleeve that has an inlet, an outlet and a first internal flow passage extending therebetween. The outlet of the adapter sleeve is fixedly secured to the inlet conduit so as to bring the first internal flow passage in fluid communication with the inlet conduit. The fitting also has a swivel sleeve with an inlet and an outlet. The swivel sleeve has a second internal flow passage extending between its inlet and outlet. The second inlet is adapted to be in selective fluid communication with a hose for supplying liquid to the storage tank. The outlet of the swivel sleeve is rotatably interconnected to the inlet of adapter sleeve and the second internal flow passage is in fluid communication with the first internal flow passage.

The adapter sleeve has an external surface of revolution about a first axis with an external annular groove. A swivel sleeve is rotationally movable with respect to the adapter sleeve. The swivel sleeve has an internal surface of revolution about a second axis that is coincident with the first axis. The internal surface of revolution of the swivel sleeve has a diameter that is slightly greater than the diameter of the external surface of revolution of the adapter sleeve, with the external surface of the adapter sleeve being at least partially fitted within the internal surface of the swivel sleeve. The swivel sleeve has a internal annular groove that is in axial alignment with an external annular groove of the adapter sleeve, forming a channel.

A plurality of ball bearings are located within this channel, partially located in both the external and internal annular grooves of the respective sleeves. The bearings allow relative rotation between the adapter and swivel sleeves, while preventing axial motion between the two sleeves. The bearings provide a free, smooth rotation between the adapter and swivel sleeves.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. Other features, aspects and advantages of the present invention will be fully understood when considered with respect to the following detailed description, appended claims, and accompanying drawings where:

Reference will now be made in detail to the present preferred embodiment of the invention, an example of which is illustrated in the accompanying drawings, wherein like numerals indicate the same elements throughout the views.

DETAILED DESCRIPTION OF THE INVENTION

Figure 1:
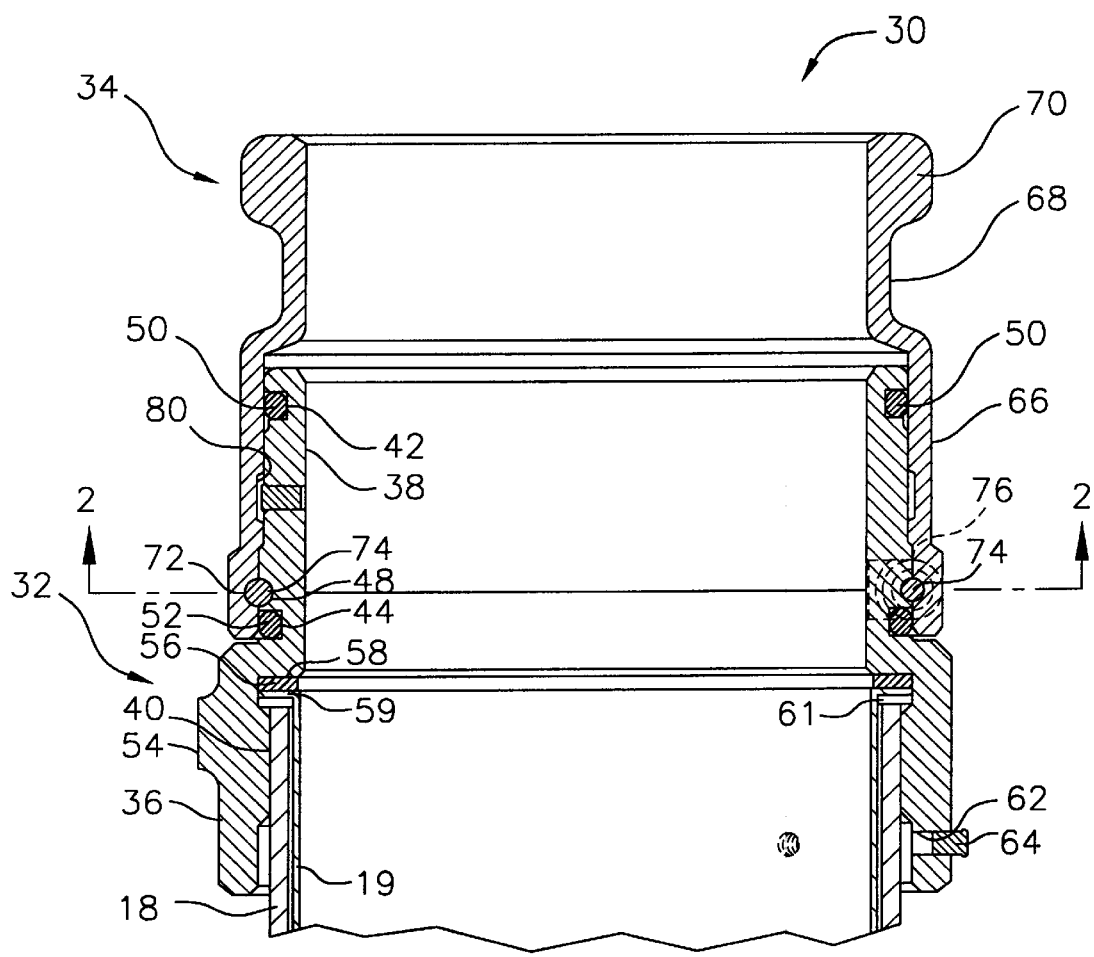
FIG 1. is a cross-sectional view of one embodiment of the present invention showing the interface between the swivel fitting and the inlet conduit.

FIG. 1 partially shows a riser line 18, which extends generally upward from the top of an underground tank (not shown). The riser line 18 extends upward through a spill container (not shown) where it is accessible for connection therewith. A drop tube 19, partially obscured by the riser line 18 in FIG. 1 is concentrically disposed within the riser line 18. While the riser line 18 extends only to the top of an underground tank, the drop tube 19, disposed concentrically within the riser line, extends below the riser line 18 and into the tank, with the lower end of the drop tube 19 terminating near the bottom of the underground tank.

The swivel fitting 30 has two main components: the lower portion is the adapter sleeve 32, and the upper portion is the swivel sleeve 34. As illustrated, the upper external portion of the illustrated riser line 18 is threaded, and this external threaded portion of the riser line 18 receives the internally threaded adapter sleeve 30. While the use of a threaded connection between the fitting and riser line is generally preferred, the fitting could be sealed to the riser line using a tapered pipe thread in combination with pipe dope or other conventional threaded pipe sealing material. Similarly, the adapter sleeve could be attached to the riser line by a flanged fitting or any number of other pipe connections as are well known in the art. If desired, the fitting could even be more permanently attached to the riser line such as by welding.

In many instances, the riser line 18 will be connected to the fitting 30 indirectly through riser line extensions or spill container components and the like, and not directly connected as shown in the specifically illustrated embodiment. Regardless as to whether the connection is direct or indirect, the fitting defines an internal flow passage that is in fluid communication with the storage tank inlet conduit, either directly with the drop tube as illustrated, or through intermediate components, to provide a liquid flow path for filling the underground tank.

As those skilled in the art will readily appreciate, the spill container provides a sealed enclosure for interconnecting between a supply hose (not shown) of a tanker truck and an inlet conduit to the underground tank. The spill container functions to contain any spills that occur during the process of filling the tank, and to protect the surrounding ground soil from contamination. The swivel fitting 30, which is used to interface between the inlet conduit and the supply hose, is preferably located in the spill container. It also will be appreciated that the swivel fitting 30 normally has a cap (not shown in the drawings) that seals the inlet conduit when the inlet conduit is not in use.

In accordance with the principles of the invention, and as is apparent from FIG. 1, the swivel fitting 30 includes an adapter sleeve 32 and a swivel sleeve 34, which components are relatively rotatable with respect to each other. The adapter sleeve 32 includes a lower portion 36 and an upper portion 38. The lower portion 36 of the adapter sleeve 32 includes an internally threaded surface 40 that is adapted and sized to fit permit the adapter sleeve to be threaded to the exterior threaded surface of the riser line 18. The upper portion 38 of the adapter sleeve is of slightly smaller diameter than the lower portion 36 and includes three annular grooves: an upper external annular groove 42 proximal to upper end of the upper portion 38 of the adapter sleeve 32, a lower external annular groove 44 proximal to the lower end of the upper portion 38 of the adapter sleeve 32, and a middle external annular groove 48 located intermediate the grooves 42 and 44. O-rings 50 and 52 are disposed in the grooves 42 and 44 respectively to provide rotary seals between the adapter and swivel sleeves 32 and 34 respectively. The O-rings 50 and 52 form a seal between the outer wall of the adapter sleeve 32 to the inner wall of the swivel sleeve 34. In the preferred embodiment, the O-rings are coated with TEFLON® to reduce friction. Such TEFLON®-coated O-rings are manufactured by M-Cor, Inc. of Wood Dale, Ill. and are sold under the name NCAP-O-SEAL™.

The lower portion 36 of the adapter sleeve 32 has a plurality of angularly spaced bosses 54 on its exterior diameter which are useful for threading the lower portion 36 onto the riser line 18. A first gasket 56 is interposed between a horizonal seat 58 above the threaded surface 40 of the lower portion 36 of the adapter sleeve and the top side of a flange 59 of the drop tube 19 to provide a liquid seal between the adapter sleeve 32 and the drop tube 19. A second gasket 61 is positioned along the lower side of the drop tube flange 59 and the riser line 18 to provide a vapor seal to prevent leakage of vapor rising in the concentric space between the drop tube 19 and the riser line 18. The gaskets 56 and 61 are compressively engaged as the lower portion 36 of the fitting 30 is rotated onto the riser line 18. The lower section 36 of the adapter sleeve 32 also includes two threaded apertures 62 (only one of which is shown in FIG. 1) through which set screws 64 are advanced to secure the lower section 36 relative to the riser line 18 once the lower section 36 is rotated to a tightened position.

The swivel sleeve 34 of the illustrated fitting 30 has three general sections: a lower section 66, an intermediate section 68 and an upper section 70. The lower section 66 of the swivel sleeve has an internal diameter that is slightly larger than the external diameter of the upper portion 38 of the adapter sleeve 32. The lower section 66 of the swivel sleeve also has an axial dimension that generally corresponds to the axial dimension of the upper portion 38 of the adapter sleeve 32 so as to allow the upper portion 38 of the adapter sleeve 32 to be substantially fully disposed within the lower section 66. The upper section 70 of the swivel sleeve 34 has an external diameter that is substantially equivalent to the external diameter of the lower section 66. The intermediate section 68 has an external diameter that is reduced relative to both the lower and upper sections 66 and 70 respectively. The reduced diameter of the intermediate section 68 functions to provide a quick release fitting for a seal cap (not shown) or a top seal delivery nozzle (not shown) that are fitted over the top of the swivel sleeve 34. Quick release fittings, such as a top seal delivery nozzle, are well known in the art for providing a convenient means of connecting a product delivery hose to a riser line during transfer of product from a tanker truck to the underground storage tank. Such fittings or fill adapters permit quick connection and disconnection of the nozzle of the delivery hose to the riser line, or quick connection and disconnection of a cap to the riser line.

Figure 2:
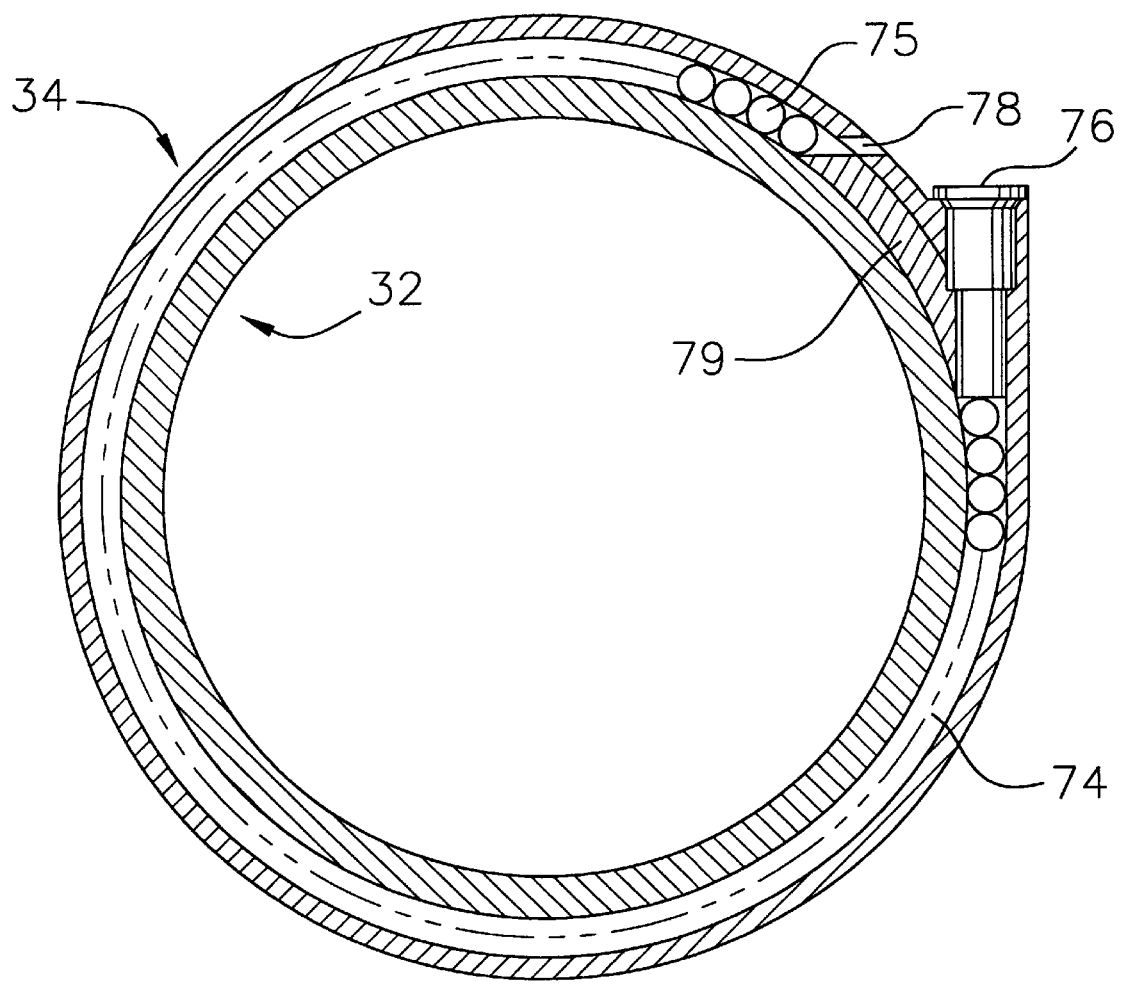
FIG. 2 is a partial sectional plan view of the fitting of FIG. 1, showing the channel containing the ball bearings.

The lower section 66 of the swivel sleeve 34 has an internal annular groove 72 that is positioned in axial correspondence to the external annular groove 48 of the adapter sleeve 32. FIG. 2 illustrates how the internal annular groove 72 of the swivel sleeve 34 cooperates with the external annular groove 48 of the adapter sleeve 32 to form a channel 74 for receiving a plurality of ball bearings 75. In the preferred embodiment, the ball bearings are packed in lubricating grease in the channel 74. In other embodiments, other lubricating media may also be used, or the ball bearings may be used with no lubrication. In a preferred embodiment, the swivel sleeve 34 defines a bearing opening 76 for inserting the ball bearings 75 into the channel 74. The bearing opening 76 is also used to insert any lubricating media, such as packing grease, into the bearing channel 74. In the preferred embodiment, the bearing opening 76 extends tangentially from the horizontal circumference of the channel 74. It will be appreciated that a variety of other configurations might also be used, such as an opening perpendicular to the horizontal circumference of the channel.

The ball bearings 75 are inserted into the channel 74 through the bearing opening 76 in the lower portion 66 of swivel sleeve 34. In the preferred embodiment, the bearing opening 76 is threaded, and a set screw (not shown) is used to close the bearing opening 76 once the ball bearings are in the channel. In the preferred embodiment, an additional opening 78 in the lower portion 66 of swivel sleeve 34 is provided, proximate to the bearing opening 76 and along the horizontal circumferential plane of the channel 74. This additional opening 78 is adapted to receive a tool for pushing the ball bearings 75 out of the channel 74 through the bearing opening 76. In the preferred embodiment, the additional opening 78 has a diameter less than that of the ball bearings, so that the ball bearings may not exit the channel through the additional opening 78. A wire, flexible rod or other tool is inserted into the additional opening 78 and used to push the ball bearings out through the bearing opening 76 such as may be required for routine maintenance of the fitting. In the horizontal circumferential plane of the channel 74, the majority portion of the volume of the channel 74 between the bearing opening 76 and the additional opening 78 is adapted to receive bearings; the remaining minority portion of the volume of the channel between the bearing opening 76 and the additional opening 78 is blocked by a key 79 so that ball bearings may not enter into this portion of the channel 74. It will be appreciated that the placement of the additional opening 78 along the external surface of the swivel sleeve 34, and thus along the wall of the channel 74, may be varied, and the additional opening 78 may be located on, above or below the horizontal centerline of the channel 74.

In the preferred embodiment, the ball bearings 75 may be easily removed through the bearing opening 76. A flexible tool or "snake" my be inserted into the additional opening 78 to force the ball bearings out of the channel 74 through the bearing opening 78. In another embodiment, a secondary bearing opening is provided, and ball bearings may be inserted into or removed from the channel through either opening. In such an embodiment, the secondary bearing opening may be closed with a set screw, similar to the preferred closure of the opening 76. It will be appreciated that the insertion and/or removal of ball bearings into the channel 74 may be accomplished in a variety of other manners, including openings perpendicular to the fitting 30, multiples openings along the outer wall of the swivel sleeve 34, or even a single opening in the outer wall of the swivel sleeve 34.

The bearings allow the adapter sleeve 32 and swivel sleeve 34 to rotate relative to each other, while simultaneously restricting these components from relative axial movement. In a preferred embodiment of the present invention, both the adapter sleeve 32 and the swivel sleeve 34 are formed of a durable and electrically conductive material, most preferably bronze. Further, in accordance with the preferred embodiment of the invention, the bearings are also formed of an electrically conductive material, preferably stainless steel. Hence, the bearings provide an electrical path between the adapter sleeve 32 and swivel sleeve 34 so as to prevent static electricity buildup, eliminating the need for grounding plates. However, it will be appreciated that in other embodiments, the adapter sleeve, swivel sleeve, ball bearings, or any combination of the three may be formed from non-conductive materials. The primary requirement is that the material of construction allow free and smooth rotation between the adapter sleeve and the swivel sleeve.

In another embodiment of the preferred invention, relative axial motion between the adapter sleeve and the swivel sleeve is prevented by a secondary method, in addition to the ball bearings. Thus in the event of a failure of the bearings, or during replacement or repacking of the bearings, the cooperation relative axial motion between the adapter sleeve 32 and the swivel sleeve 34 is still limited, without the necessity of bearings. In the preferred embodiment, the lower section 66 of the swivel sleeve has a second internal annular groove 80. This internal annular groove 80 is in axial alignment with a threaded aperture 82 in the upper portion of the adapter sleeve 32. A set screw 84 extends through the aperture 82 and projects beyond the outside diameter of the adapter sleeve's upper portion 38. The projecting structure formed by the set screw varies the diameter of the upper portion 38 and extends into the groove 80. Preferably, the set screw 84 is not advanced so far into the groove 80 as to hinder relative rotation, and the surfaces of the groove 80 are spaced from the set screw, both radially and axially. The annular groove has upper and lower surfaces that are respectively spaced axially above and below the projecting structure. The annular groove also has an annular surface that is radially spaced from the projecting structure. The projecting surface extends into the annular groove so that the projecting structure and annular groove cooperate to prevent axial movement between the adapter sleeve and the swivel sleeve for a distance greater than the axial spacing between the projecting structure and the groove. As those skilled in the art will readily appreciate, such spacing allows the adapter sleeve 32 and the swivel sleeve 34 to rotate freely relative to each other. This arrangement also limits axial movement relative between the adapter sleeve and the swivel sleeve to the axial spacing between the set screw 82 and the groove 80 in the event the ball bearings 75 fail or are removed from the channel. It will be appreciated that in another embodiment of the present invention, the location of the projecting structure and the corresponding annular groove could be reversed, e.g., the projecting structure could be located on the inner surface of the swivel sleeve, and the annular groove could be located on the out surface of the adapter sleeve.

In the preferred embodiment, the projecting structure projects radially outwardly from the adapter sleeve and the diameter of the adapter sleeve at the location of the projecting structure is greater than the diameter of those portions of the adapter sleeve that are axially adjacent to the projecting structure. Again, it will be appreciated that in another embodiment, the projecting structure projects inwardly from the inner surface of the swivel sleeve, and that the diameter of the swivel sleeve at the location of the inwardly projecting structure is less than the diameter of those portions of the swivel sleeve that are axially adjacent to the projecting structure.

In a preferred embodiment of the present invention, the projecting structure is a set screw that is adjustably extendable from the adapter sleeve in a radially outward direction.

It will be appreciated that in another embodiment, where the annular groove is located on the outer surface of the adapter sleeve, the projecting structure is a set screw that is adjustably extendable from the swivel sleeve in a radially inward direction.

The swivel fitting of the present invention is preferably constructed of a durable metal or metal alloy as is well known in the art. In the preferred embodiment, the adapter sleeve and the swivel sleeve of the fitting are constructed of bronze. Bronze is preferred for its desirable electrical grounding properties. For durability, the ball bearings are preferably constructed of stainless steel. It will be appreciated that any number of other materials that provide the required durability or electrical conductivity might also be used.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto. While the presently preferred embodiment of the invention has been disclosed, a number of variations would be apparent to one of ordinary skill in the art based on the above disclosure. Other changes in the form and detail of the preferred embodiment may similarly be made without departing from the spirit and scope of the invention which is intended to be defined by the following claims.

What is claimed is:

1. A swivel fitting for engaging a pipe, comprising:
   an adapter sleeve having an external surface of revolution that is concentrically disposed about a first axis, having an external annular groove;
   a swivel sleeve that is rotationally movable with respect to the adapter sleeve during use, the swivel sleeve having an internal surface of revolution that is concentrically disposed about a second axis that is coincident with said first axis, the internal surface of revolution having a diameter that is slightly greater than the diameter of the external surface of revolution, the external surface being at least partially fitted within the internal surface, and having an internal annular groove that is in axial alignment with the external annular groove to form a channel, the swivel sleeve defining a first tangential opening in communication with the channel;
   a plurality of ball bearings located in the channel formed by the alignment of the internal and external annular grooves to permit free rotation between the adapter sleeve and the swivel sleeve, wherein the first tangential opening is of a diameter slightly larger than the ball bearings to permit the insertion and removal of the ball bearings to and from the channel;
   a second opening in the swivel sleeve proximate to the first tangential opening;
   wherein the first tangential opening and the second opening bound a majority portion and a minority portion of the channel, further comprising a key occupying the minority portion of the channel such that bearings may not enter or occupy the minority portion of the channel;
   wherein the second opening is of insufficient size to allow passage of a ball bearing; and
   a removable plug for closing the first tangential opening without extending into the bearing channel to prevent the ball bearings from exiting the bearing channel.

2. In combination with an inlet conduit for an underground liquid storage tank, a rotatable swivel fitting for connecting a supply hose to the inlet conduit, comprising:
   an adapter sleeve, the adapter sleeve having an inlet, an outlet and a first internal flow passage extending therebetween, the outlet of the adapter sleeve being fixedly secured to the inlet conduit with the first internal flow passage being in fluid communication with the inlet conduit;
   a swivel sleeve, the swivel sleeve having a second inlet, an outlet and a second internal flow passage extending therebetween, the second inlet being adapted to be in selective fluid communication with a hose for supplying liquid to the storage tank, the outlet of the swivel sleeve being rotatably interconnected to the inlet of the adapter sleeve, the second internal flow passage being in fluid communication with the first internal flow passage, wherein the adapter sleeve and swivel sleeve together define a bearing channel, and the swivel sleeve further defines a first tangential opening in communication with the bearing channel and a second opening in communication with the bearing channel;
   a plurality of ball bearings interposed in the bearing channel, the ball bearings being operative to restrict relative axial movement but to allow relative rotational movement between the adapter sleeve and the swivel sleeve, wherein the first tangential opening is of a size slightly larger than the ball bearings to permit insertion and removal of the ball bearings and the second opening is of a size slightly smaller than the ball bearings;
   a removable plug for closing the first tangential opening without extending into the bearing channel to prevent the ball bearings from exiting the bearing channel; and
   a seal between the adapter sleeve and the swivel sleeve.

3. A rotatable swivel fitting as in claim 2, wherein the seal is an O-ring.

4. A swivel fitting for engaging a pipe, comprising:
   an adapter sleeve having an external surface of revolution that is concentrically disposed about a first axis, having an external annular groove;
   a swivel sleeve that is rotationally movable with respect to the adapter sleeve during use, the swivel sleeve having an internal surface of revolution that is concentrically disposed about a second axis that is coincident with said first axis, the internal surface of revolution having a diameter that is slightly greater than the diameter of the external surface of revolution, the external surface being at least partially fitted within the internal surface, and having an internal annular groove that is in axial alignment with the external annular groove to form a channel, the swivel sleeve defining a first opening into the channel and a second opening into the channel proximate the first opening wherein the first and second openings bound a majority portion and a minority portion of the channel;
   a plurality of ball bearings of a size capable of fitting through the first opening, the bearings located in the channel formed by the alignment of the internal and external annular grooves;
   wherein the second opening is of insufficient size to allow passage of a ball bearing;
   a key occupying the minority portion of the channel such that bearings may not enter or occupy the minority portion of the channel; and
   a removable plug for closing the first opening without extending into the bearing channel to prevent the ball bearings from exiting the bearing channel.

* * * * *